G. H. GRIMM.
HEATER FOR EVAPORATORS.
APPLICATION FILED AUG. 3, 1909.

962,830.

Patented June 28, 1910.

WITNESSES

INVENTOR
Gustav Henry Grimm
BY
ATTORNEYS

UNITED STATES PATENT OFFICE.

GUSTAV HENRY GRIMM, OF RUTLAND, VERMONT.

HEATER FOR EVAPORATORS.

962,830.  Specification of Letters Patent.  Patented June 28, 1910.

Application filed August 3, 1909. Serial No. 511,051.

*To all whom it may concern:*

Be it known that I, GUSTAV HENRY GRIMM, a citizen of the United States, and a resident of Rutland, in the county of Rutland and State of Vermont, have invented a new and Improved Heater for Evaporators, of which the following is a full, clear, and exact description.

The invention relates to evaporators for use in the manufacture of maple sugar, sorghum, fruit jellies, and other food products, and such, for instance, as shown and described in the Letters Patent of the United States, No. 884,272, granted to me on April 7, 1908.

The object of the present invention is to provide a new and improved heater, for the initial heating of the sap or other liquid to be treated prior to its passage into the boiling pan, the heater being removably set in the boiling pan, and the inlet and outlet for the liquid are arranged for convenient right or left-hand connection with the overhead storage tank and the regulator, and the heater provides a large heating surface and is provided with means for the escape of air and excess vapors rising from the heated liquid.

A practical embodiment of the invention is represented in the accompanying drawings forming a part of this specification, in which similar characters of reference indicate corresponding parts in all the views.

Figure 1:
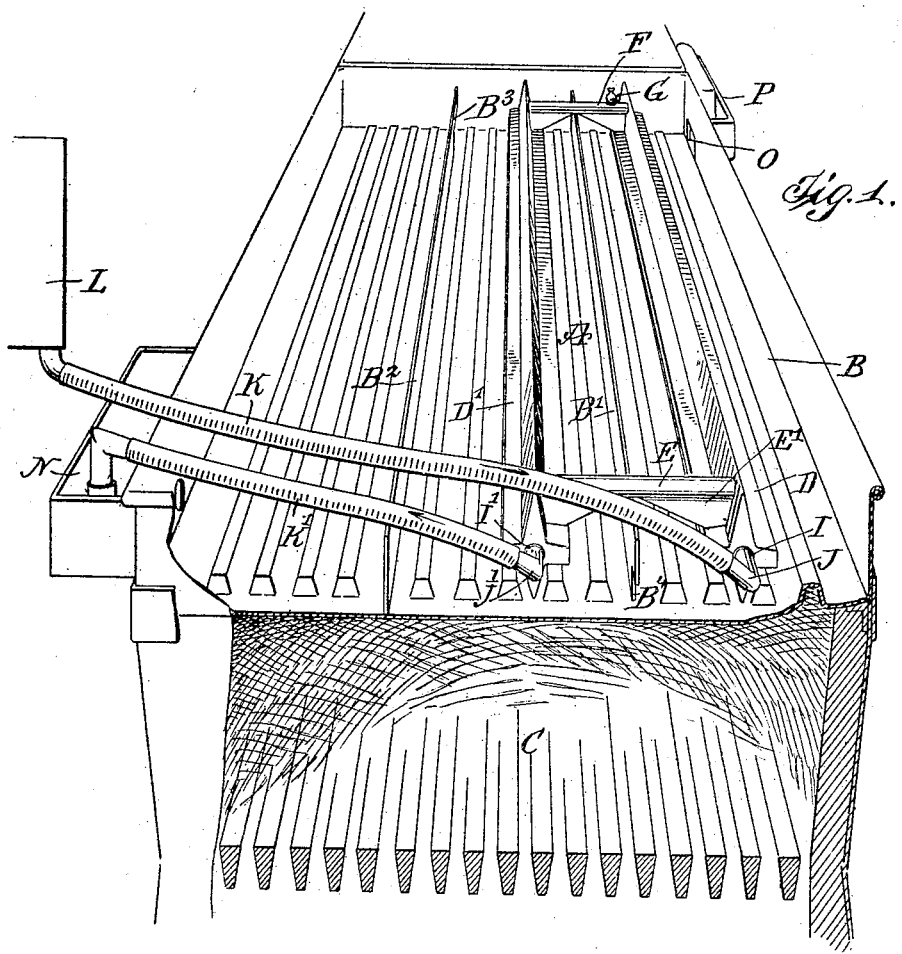
Figure 2:
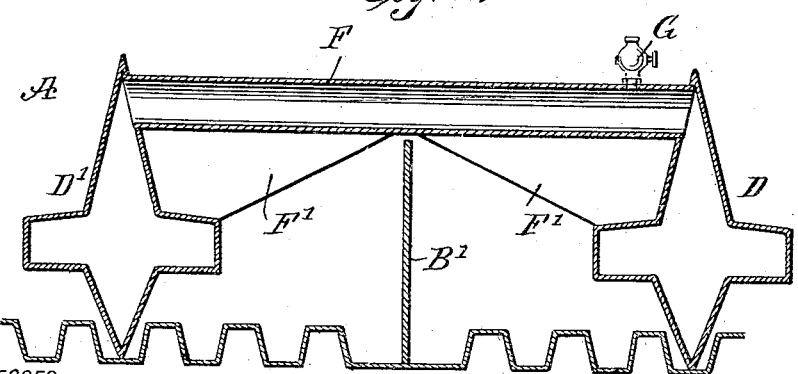

Figure 1 is a perspective view of the heater in position in the boiling pan, the latter and the furnace being shown in cross section; and Fig. 2 is a transverse section of the heater at the rear end thereof.

The heater A is removably set in the boiling pan B mounted on the top of the furnace C at the front end thereof in the usual manner, and the heater A consists essentially of hollow legs D, D' connected with each other near the front by a brace E and at the rear by a tube F, to establish communication between the rear ends of the legs D and D'. On the tube F is arranged a relief valve G for the passage of air or excessive vapors that may arise from the sap flowing through the heater, so that by the use of the relief valve G a free flow of the sap through the heater is at all times assured.

The tube F is connected at its under side by braces F' with the legs D, D' to hold the same properly spaced, and the braces have their lower edges beveled and terminating near the middle of the tube F, to accommodate the permanent partition B' extending lengthwise in the pan B, the said partition also passing under the brace E, having wings E' similar to the tube braces F'. The tube F and its braces F' and the brace E and its wings E' straddle the partition B' and thus hold the heater A against lateral movement.

The legs D, D' are approximately cruciform in cross section, as plainly shown in Fig. 2, so as to provide a large heating surface for the sap or other liquid flowing through the legs D and D'. The front ends of the legs D and D' are respectively provided with an inlet I and an outlet I', engaged by swing couplings J, J', of which the coupling J is adapted to be connected by a tube K with the overhead storage tank L, and the coupling J' is connected by a tube K' with a regulator N, arranged at one side of the boiling pan B. The regulator N discharges the sap into the pan B and serves to regulate the height of the sap in the pan, as is well known. Now by having the swing couplings J, J' and the tubes K, K', it is evident that the storage tank L and the regulator N may be used on either side of the evaporator, as the swing couplings allow swinging of the tubes K, K' to either side of the evaporator, to connect with the storage tank L and the regulator N, respectively.

It is understood that when the evaporator is in use, the sap flows from the storage tank L through the tube K, swing coupling J and inlet I into the front end of the leg D, and then the sap flows rearwardly in the leg D to finally pass from the rear end by way of the tube F into the rear end of the leg D', to then flow forward therein and out through the outlet I' into the swing coupling J', to pass by way of the tube K' into the regulator N and from the latter into the pan B.

The pan B is provided with another lengthwise extending partition $B^2$ having a recess $B^3$ at the rear end, so that the sap entering the pan B from the regulator N flows first rearwardly in the left hand side of the pan B, then forwardly in the middle portion of the pan, and then passes through an opening $B^4$ in the front end of the partition B', into the right hand portion of the pan B, and rearwardly therein to finally pass out of the pan at O into a siphon P, to be further treated as more fully described in the Letters Patent of the United States above referred to.

From the foregoing it will be seen that the sap receives a preliminary heating while passing through the heater A, and the sap is subsequently evaporated in the pan B in the usual manner.

By making the heater A portable, it can be readily placed in position in the pan B or removed therefrom whenever it is desired to do so.

Having thus described my invention, I claim as new and desire to secure by Letters Patent:

1. A preliminary heating receptacle for evaporators, comprising spaced hollow legs, each approximately cruciform in cross section, a hollow connection between the legs at one end thereof, braces connecting the said hollow connection with the legs, and a brace connecting the hollow legs with each other at the other end of the legs.

2. A preliminary heating receptacle for evaporators, comprising spaced hollow legs approximately cruciform in cross section, a hollow connection between the legs, braces connecting the underside of the hollow connection with the said legs and terminating near the middle of said hollow connection, at one end, a brace connecting the hollow legs with each other at the other end of the legs, and a relief valve on top of the said hollow connection.

3. A preliminary heating receptacle for evaporators, comprising spaced hollow legs approximately cruciform in cross section, a hollow connection between the upright members at one end of the legs, braces connecting the underside of said hollow connection with the legs and terminating near the middle of said hollow connection, a brace connecting the hollow legs with each other at the other end of the legs, and swing couplings at the front ends of the said legs.

4. A preliminary heating receptacle for evaporators, comprising spaced hollow legs approximately cruciform in cross section, a hollow connection between the upright members at one end of the legs, braces connecting the hollow connection at its underside with said legs, the said braces having their lower edges beveled and terminating near the middle of said hollow connection, a brace connecting the hollow legs with each other at the other end of the legs, one of the legs having an inlet at the front end and the other leg having an outlet at its front end, swing couplings connected with the said inlet and the said outlet, and tubes connected with the said swing couplings.

5. A preliminary heating receptacle for evaporators, comprising spaced hollow legs each having a bottom member approximately V-shaped in cross section, a top member of inverted V-shape in cross section and side members each approximately rectangular in cross section, a hollow connection between the top members of the legs at one end thereof, and a brace connecting the hollow legs with each other at the other end of the legs.

6. In combination, a boiling pan and a preliminary heating receptacle for the sap and removably set in the said boiling pan, to form longitudinal partitions therein for the circulation of the sap in the boiling pan, and reversible inlet and outlet connections on the front end of the heating receptacle.

7. In combination, a boiling pan having a longitudinal partition therein, and a preliminary heating receptacle for the sap and removably set in the said boiling pan, the said heating receptacle comprising spaced hollow legs, a tube connecting the legs at one end, braces connecting the tube at its underside with said legs, the said braces terminating near the middle of the tube to accommodate the said partition, a brace connecting the other ends of said legs with each other and having wings at its underside between which the said partition extends, and inlet and outlet connections for the heating receptacle.

8. In combination, a boiling pan having a longitudinal partition therein, and a preliminary heating receptacle for the sap and removably set in the said boiling pan, the said receptacle having spaced hollow legs extending at each side of said partition, a tubular connection between the upper part of the legs at the rear end, the said tubular connection being provided with a relief valve, braces connecting the tubular connection with the legs, a brace connecting the front ends of the legs with each other, one of the legs having an inlet at the front end and the other leg an outlet at the front end, swing couplings connected with the said inlet and the said outlet, and tubes connected with said swing couplings.

In testimony whereof I have signed my name to this specification in the presence of two subscribing witnesses.

GUSTAV HENRY GRIMM.

Witnesses:
GEORGE L. KIRK,
C. O. PAULIN.